United States Patent Office

3,350,162
Patented Oct. 31, 1967

3,350,162
METHOD OF CREASEPROOFING AND STIFFENING CELLULOSE TEXTILE WITH DIMETHYLOL ETHYLENE UREA AND AMYLOPECTIN SIZE
Edward A. Beck, Decatur, Ill., assignor to A. E. Staley Manufacturing Company, Decatur, Ill., a corporation of Delaware
No Drawing. Filed Jan. 28, 1963, Ser. No. 254,419
1 Claim. (Cl. 8—115.6)

My invention relates to a method for imparting water insoluble finishes to textiles. More particularly, my invention relates to a method for imparting a water insoluble stiffening finish to cellulose-containing textile materials which resist absorption of chlorine, wrinkling, and losses in tear strength and breaking strength. My invention also relates to novel compositions for providing such finishes.

Previously, cellulose fabrics, such as cotton, have been impregnated with aqueous dispersions of carbohydrate crosslinking agents and then dried and cured to obtain textiles having water insoluble finishes which are wrinkle or crush resistant. In order to obtain a fabric which possesses these properties, but also has a high degree of stiffness, aqueous dispersions of native starch and crosslinking agents with accompanying catalysts have been utilized. In order to prepare such dispersions, it is first necessary to form an aqueous starch dispersion at temperatures on the order of 165° F. and above. It was found, however, that after the dispersions were formed and then allowed to cool to room temperature, a gel was produced thus making it difficult to apply the composition to the textile.

It was later found that the problem of gel formation could be solved by the substitution of modified starches, such as etherified or acid-treated starches, for the native starch; and, in addition, it was discovered that generally superior fabric finishes could be obtained by utilizing these starches. However, the use of modified starches did not remove the necessity for using high temperatures in order to form the aqueous dispersions. Further, the high cost of chemically modifying starch has greatly limited the acceptance of modified starch by the textile industry.

In accordance with the present invention, I have now provided a water insoluble finish for cellulose fabrics which is superior to the finish produced by the use of aqueous dispersions of modified starches and crosslinking agents. In addition, the present invention provides a means for preparing the aqueous starch dispersions at room temperature.

It is, accordingly, one object of this invention to provide a method for treating textile fabrics comprising cellulose fibers to obtain a water-insoluble finish of high stiffness.

It is a further object of this invention to provide a cellulose-fiber fabric which has a high degree of resistance to wrinkling, chlorine absorption, and losses in breaking strength and tear strength after repeated launderings.

It is a still further object of this invention to provide an economical finishing composition for cellulose-containing textile fabrics that can be prepared at room temperature.

Still further objects and advantages of this invention will become apparent from the following description and the appended claim.

The process of my invention is generally carried out by impregnating the textile material comprising cellulose fibers with an aqueous dispersion comprising amylopectin, a carbohydrate crosslinking agent, and a curing catalyst. The dispersion should contain not more than 15% by weight dry solids amylopectin, the weight based on the weight of the dispersion. The amylopectin and crosslinking agent should be present in the dispersion in a weight ratio betwen 5:1 and 2:1. After impregnation, the treated textile is dried and cured to provide a water insoluble finish.

The term "amylopectin" is used in this application to designate that fraction of starch which is branch chained and cold water-soluble. Amylopectin is distinguishable from starch granules, which contain both amylose and amylopectin, and from amylose itself, by its cold water-solubility characteristics and by its chemical configuration.

Types of crosslinking agents which may be utilized include nitrogen-containing compounds having more than one reactive methylol group, such as the urea-formaldehyde condensation products, for example, dimethylol ethylene urea, dimethylol urea, dimethylol-1,3-propylene urea, dimethylol-1,3-butylene urea, dimethylol dihydroxy ethylene urea; the triazones, such as 1,3-bis(hydroxymethyl)-tetrahydro-5-ethyl-2-triazone,
1,3-bis(hydroxymethyl)-tetrahydro-5-propyl-2-triazone,
1,3-bis(hydroxymethyl)5-methyl-2-triazone;

the pyrimidinones, such as 1,3-bis(hydroxymethyl)-tetrahydro-2-pyrimidinone,
1,3-bis(hydroxymethyl)-tetrahydro-5-methyl-2-pyrimidinone,
1,3-bis(hydroxymethyl)-tetrahydro-5-hydroxy-2-pyrimidinone,
1,3-bis(hydroxymethyl)-tetrahydro-5-ethyl-2-pyrimidinone;

the hydantoins, such as 1,3-bis(hydroxymethyl)-2-hydantoin,
1,3-bis(hydroxymethyl)4-methyl-2-hydantoin,
1,3-bis(hydroxymethyl)4,4-bis(methyl)-2-hydantoin;

the melamine formaldehyde condensation products, for example, dimethylol melamine, trimethylol melamine, hexamethylol melamine, etc. and the like. Further types of crosslinking agents are those having more than one functional aziridinyl group, for example, tris (aziridinyl) phosphine oxide, tris (aziridinyl) phosphine sulfide, carbonyl bis aziridine, N,N'-bis(ethyleneiminoformyl) ethylene diamine, N,N'-bis(ethyleneiminoformyl) butylene diamine and the like. Additional types of crosslinking agents are the dialdehydes and the polymeric acetals. Such dialdehydes include adipaldehyde, succinaldehyde, glutaraldehyde and glyoxal. Such polymeric acetals are those prepared by the condensation of aldehydes such as formaldehyde, propanal, butanal, etc., with alkylene glycols, such as ethylene glycol, diethylene gylcol, triethylene glycol, etc. A method for making such acetyls is given in U.S. Patent 2,786,081 to Bernard H. Kress. Still further types of crosslinking agents are the epoxides having more than one functional group, for example, 1,3-diglycidyl glycerol, the diglycidyl ether of ethylene glycol, the diglycidyl ether of 2,2-bis (p-hydroxyl phenyl) propane, butadiene diepoxide, and the like. Mixtures of the foregoing crosslinking agent may also be utilized.

It has been found that superior results are obtained when dimethylol ethylene urea is utilized as the crosslinking agent in my invention. When used in my invention, dimethylol ethylene urea efficiently crosslinks amylopectin and cellulose to impart a fine permanent finish. Important, also, is the ability to obtain a soft and non-brittle finish when using dimethylol ethylene urea. Since this preferred crosslinking agent tends not to react with itself to form a hard brittle finish, its use is especially advantageous when a non-brittle finish or high stiffness is desired.

Types of curing catalysts that are suitable for use in my invention include the salts of an amino or substituted-amino aliphatic alcohol and phosphoric or hydrochloric acid, for example, salts such as 2-aminobutanol-1-phosphate, 2-aminobutanol-1-hydrochloride, 2-amino-2-methylpropanol-1-phosphate, 2-amino-2-methylpropanol-1-hydrochloride, 1-amino-2-methylbutanol-2-phosphate, 1-amino-2-methylbutanol-1-hydrochloride, diethanol amine hydrochloride or phosphate, monomethanol amine hyrochloride or phosphate, triethanol amine hydrochloride or phosphate and the like; metal salts of weak bases and strong acids such as zinc chloride, zinc nitrate, magnesium chloride, zinc sulfate, zinc fluoborate, magnesium perchlorate, aluminum sulfate, aluminum fluoborate; inorganic and organic acids such as hydrochloric, phosphoric, sulfuric, acetic, citric, succinic and the like. Generally, the particular catalyst to be utilized in my process will depend on the crosslinking agent employed. When dimethylol ethylene urea is utilized, it is preferable, because of its efficiency as a catalyst, to utilize zinc nitrate.

The weight ratio of amylopectin to crosslinking agent in the textile treating compositions of my invention is critical. In order to produce a sufficient degree of stiffness, in acompaniment with a general overall balance of desirable properties, such as tear strength, wrinkle resistance, and breaking strength, it is necessary to maintain the ratio of amylopectin to crosslinking agent between 5:1 and 2:1. Within this range, the optimum weight ratio of amylopectin to crosslinking agent will depend chiefly on the particular crosslinking agent utilized. When dimethylol ethylene urea is the crosslinking agent, optimum results are obtained when a weight ratio of amylopectin to dimethylol ethylene urea between 4:1 and 3:1 is employed.

The optimum amount of curing catalyst is largely dependent on the amount of crosslinking agent utilized. Generally, it is not necessary or economical to utilize a weight ratio of crosslinking agent to curing catalyst of less than 2:1 and generally satisfactory results are obtained when the weight ratio of crosslinking agent to curing catalyst is maintained between 2:1 and 15:1.

The textile treating compositions of my invention comprise aqueous dispersions of amylopectin, curing catalysts and crosslinking agents. The concentration of amylopectin dry solids in the dispersion, as previously stated, should not exceed 15% by weight, based on the weight of the dispersion. When more than 15% by weight of amylopectin is present in the dispersion, the dispersion is excessively viscous and is difficult to apply to the fabric. The lower concentration of amylopectin in the dispersion is relatively unimportant and concentrations of even less than 0.5% can conceivably be utilized. However, it is not practical to use less than 0.5% of amylopectin in the dispersion. In general, in order to obtain a proper dry-solids add-on of finishing agent to the textile in a practical period of impregnation time, it is preferable to utilize from about 1 to about 12% by weight of amylopectin in the dispersion.

Although the fundamental ingredients of the textile finishing composition of my invention are amylopectin, crosslinking agent and curing catalyst, numerous other materials may be and are added to further modify cellulose fabrics. The finishing compositions may contain textile auxiliaries that are customarily used, such as softening agents, wetting agents, antifoaming agents, bodying agents and the like.

As examples of bodying agents which may be employed, there may be mentioned aqueous emulsions of water-insoluble thermoplastic vinyl resins, such as polymers and copolymers of vinyl acetate, vinyl chloride styrene, alkyl acrylate, alkyl methacrylate, vinylidene chloride, and the like, and/or water-soluble or alkali-soluble thermoplastic resins, such as polyvinyl alcohol, water-soluble partially hydrolyzed polyvinyl acetates, hydrolyzed polyalkyl (methyl) acrylates, vinyl alkyl (methyl) ether-maleic anhydride and the like. Generally, such agents are employed in amounts of about 0.05 to 5% by weight based on the weight of the dispersion.

As examples of wetting agents which may be used, there may be mentioned nonionic polyethylene condensation products. Such products have water soluble portions of from 2 to 120 oxyethylene units and a water insoluble portion that preferably contains at least one alkyl group with a total of 4 to 18 carbon atoms. The alkyl group may be linked to the polyethylene chains through a phenoxy group. These wetting agents are represented by the alkylaryl ethers butyl phenoxy polyoxyethylene, heptyl phenoxy polyoxyethylene, octyl phenoxypolyoxyethylene, nonyl phenoxy polyoxyethylene, tridecyl phenoxypolyoxyethylene and the like, alkylphenoxypolyoxyethylenes, similar polyoxyethylene derivatives of methylene-linked alkyl phenols; thioethers of polyoxyethylene with nonyl, dodecyl, tetradecyl, t-dodecyl and the like, alkyl groups (made by condensing ethylene oxide with mercaptans) or with alkylthiophenols having alkyl groups of from four to fifteen carbon atoms; ethylene oxide derivatives of long-chain carboxylic acids, such as lauric, myristic, palmitic, oleic, an the like; and analogous ethylene oxide condensates of long-chain alcohols, such as octyl, dioctyl, decyl, lauryl, or cetyl alcohols. Generally, such agents are employed in amounts of 0.05 to 3% by weight, based on the weight of the dispersion.

As example of antifoaming agents, there may be mentioned water-insoluble silicone compounds, water insoluble oils, water-insoluble alcohols, and the like. The amount of such agents used varies with their effectiveness in minimizing foaming, but in general, amounts of 0.01 to 0.5% by weight, based on the weight of the dispersion may be employed.

As examples of softening agents, there may be mentioned cationic softeners such as N,N-bis(hydroxyethyl) stearylamide, N-stearoyl-N,N'-bis (ethyl) ethylene diamine, N,N-bis(hydroxymethyl) stearylamide, the monostearate of N,N-bis(hydroxyethyl) stearylamide; cationic quaternary ammonium salts such as N,N-bis-(stearyl)-N,N-bis(methyl) ammonium chloride, N,N-bis-(stearyl)-N,N-bis(ethyl) ammonium chloride, and their analogous methyl sulfates. Other examples of softening agents are the nonionic alkylphenoxypolyethylene glycols such as those disclosed in U.S. Patent 3,069,361 to George W. Cogswell issued Dec. 18, 1962 which also serve, as previously stated, as wetting agents. Generally, such agents are practically employed in amounts of 0.5 to 5%. It is preferable in order to avoid precipitation from the dispersion to avoid anionic softeners whenever a metal salt is employed as the curing catalyst.

The viscosity of dispersions containing amylopectin are affected by the addition thereto of softening agents. Generally, when the viscosity of textile treating compositions is increased, the ability of the compositions to penetrate textile fibers is decreased. In order to obtain maximum add-on of finishing compositions, it is necessary that the compositions effectively penetrate the textile fiber. Thus, it is desirable not to incorporate softeners into the compositions of my invention which, when used in practical amounts, significantly raise the viscosity of the compositions and thereby lower their penetrating ability. The addition of softeners to aqueous dispersions containing 2% or less of amylopectin has very little effect on the viscosity of the dispersion. However, when softeners are added to dispersions containing around 5% amylopectin the viscosity of the dispersions is either slightly decreased, slightly increased or greatly increased. For example, when a lecithin emulsion containing nonylphenoxypolyoxyethylene glycol or polyethylene glycol monostearate (polyethylene glycol molecular weight approximately 400) is added to 5% aqueous amylopectin dispersion, only a small increase in viscosity is obtained. When softeners such as oxidized polyethylene emulsions, emulsified fatty carbamides, soap and diethylene glycol monolaurate are added to 5% aqueous amylopectin dispersions, large increases in viscosity are obtained.

Table I shows the effects of softeners used in commercial textile applications on the viscosity of aqueous dispersions containing amylopectin.

The aqueous dispersions of my invention will, on aging, form light gels when softeners which raise the viscosity of the dispersions are present therein. These gels are

TABLE I

| Percent Amylopectin Solids | Softeners and Percent Added Based on Weight of Amylopectin in the Dispersion | Brookfield Viscosity, cp. | | Temperature of Dispersion |
|---|---|---|---|---|
| | | Initial | Stirred after 24 hrs. | |
| 2 | None | 8 | 8 | 78 |
| 2 | 94% Ahcovel G, an emulsified cationic stearic acid carbamide softener manufactured by Arnold Hoffman Company. | 10 | 10 | 78 |
| 2 | 156% Moropol 700, a nonionic oxidized-polyethylene emulsion softener containing 30% solids, the polyethylene having a molecular weight of 2,000–2,500, manufactured by Moretex Chemical Products, Inc. | 8 | 8 | 77 |
| 5 | None | 40 | 40 | 74 |
| 5 | 12.5% Ahcovel G | 170–178 | 664–680 | 74 |
| 5 | 20.5% Moropol 700 | 122–144 | 244 | 74 |
| 5 | 12.5% lecithin dispersion of nonyl phenoxypolyoxyethylene glycol | 52 | 100 | 77 |
| 5 | 15% Carbowax 4000, a polyethylene glycol softener having a molecular weight of approximately 4000. | 33 | 32 | 77 |
| 5 | 6.25% Emersoft 7700 Special, a fatty based derivative manufactured by Emery Industries Inc. | 452–490 | 328 | 74 |
| 5 | 6.25% soap (Ivory) | 960–1,040 | 1,304–1,336 | 74 |
| 5 | 6.25% diethylene glycol mono-laurate | 784 | 552–560 | 74 |
| 5 | 6.25% polyethylene glycol monolaurate | 832–860 | 472–480 | 74 |
| 5 | 6.25% polyethylene glycol monostearate formed by the esterification of polyethylene glycol having a molecular weight of approximately 400 with stearic acid. | 56 | 96 | 74 |
| 5 | 6.25% polyethylene glycol monostearate formed by the esterification of polyethylene glycol having a molecular weight of approximately 1,500 with stearic acid. | 88–96 | 616–626 | 74 |
| 5 | 6.25% Sandrol 200-S, a stearic diethanol amide manufactured by Clinton Chemical Company. | 52 | 760–768 | 74 |
| 5 | 6.25% Profine Special Paste, a modified self-emulsifying fatty based ester derivative manufactured by Procter & Gamble, Inc. | 45 | 49 | 74 |
| 10 | None | 1,260–1,290 | | 76 |
| 10 | 6.25% Profine Special Paste | 1,510–1,560 | | 76 |
| 10 | None | 424 | | 180 |
| 10 | 10.25% Moropol 700 | 400 | | 180 |
| 10 | 20.5% Moropol 700 | 664 | | 180 |
| 10 | 6.3% Ahcovel G | 664 | | 180 |
| 10 | 12.5% Ahcovel G | 624 | | 180 |

An especially surprising feature of the aqueous dispersions of my invention is that even though oxidized polyethylene emulsion softeners and fatty carbamide emulsion softeners when used with 5% amylopectin dispersions significantly raise the viscosity of the dispersions, the penetrating ability and consequently the ability to obtain maximum add-ons of these dispersions are not adversely affected. The use of oxidized polyethylene emulsion softeners and fatty carbamide emulsion softeners is not limited by their effects on the viscosity of amylopectin dispersions. Thus, oxidized polyethylene emulsion softeners and fatty carbamide emulsion softeners can be satisfactorily and economically employed in the aqueous dispersions of my invention when high penetrating ability is desired.

especially useful when it is desired to coat textiles without causing excessive penetration of the yarn. A surprising feature of such gels however is that with agitation they are easily returned to the fluid state and can be then used for treatments requiring good penetration of the yarn.

The dispersions of my invention containing amylopectin, crosslinking agent and curing catalyst are especially useful when clear finishes are desired. To demonstrate this feature, dispersions were prepared and judged for clarity and then films from the dispersions were formed on glass plates and cured at 320° F. for five minutes and the films were judged for clarity. Table II shows the results of these tests.

TABLE II

| Weight in Dispersion of Amylopectin | Catalyst and Weight in Dispersion | Crosslinking Agent | Weight of Crosslinking Agent in Dispersion, percent | Dispersion Clarity | Film Clarity |
|---|---|---|---|---|---|
| 5 | 3% Zn(NO$_3$)$_2$ | Rhonite R-1, a solution of dimethylol ethylene urea containing 50% solids manufactured by Rohm & Hass Inc. | 12.5 | Clear | Clear. |
| 5 | 1% Zn(NO$_3$)$_2$ | Rhonite R-1 | 3 | do | Do. |
| 5 | 3% Zn(NO$_3$)$_2$ | Aerotex Resin 23 Special, a solution of triazine type crosslinking agent containing 50% solids manufactured by American Cyanamid Company. | 12.5 | do | Do. |
| 5 | 1% Zn(NO$_3$)$_2$ | Aerotex Resin 23 Special | 3 | do | Do. |
| 5 | 3% Zn(NO$_3$)$_2$ | Resloom M-80, a solution of melamineformaldehyde precondensate crosslinking agent containing 80% solids manufactured by Monsanto Chemical Company. | 12.5 | do | Do. |
| 5 | 1% Zn(NO$_3$)$_2$ | Resloom M-80 | 3 | do | Do. |
| 5 | 3% Zn(NO$_3$)$_2$ | Onyx Resin O-4, a solution of a triazone crosslinking agent containing 40% solids manufactured by Onyx Chemical Corporation. | 12.5 | do | Do. |
| 5 | 1% Zn(NO$_3$)$_2$ | Onyx Resin O-4 | 3 | do | Do. |
| 5 | 3% Zn(NO$_3$)$_2$ | Permafresh LCR, a solution of a mixture of triazone and unreaformaldehyde crosslinking agents containing 45% solids manufactured by The Sun Chemical Company. | 12.5 | do | Do. |
| 5 | 1% Zn(NO$_3$)$_2$ | Permafresh LCR | 3 | do | Do. |
| 5 | 3% Zn(NO$_3$)$_2$ | Quaker Reactant 16, a solution of glycol acetal crosslinking agent manufactured by Quaker Chemical Company. | 12.5 | do | Do. |
| 5 | 1% Zn(NO$_3$)$_2$ | Quaker Reactant 16 | 3 | do | Do. |
| 5 | 3% Zn(BF$_4$)$_2$ | Eponite 100, an epoxy crosslinking agent (100% solids) manufactured by Shell Chemical Company. | 12.5 | do | Slightly cloudy. |
| 5 | 1% Zn(BF$_4$)$_2$ | Eponite 100 | 3 | do | Slightly cloudy. |
| 5 | 3% Zn(BF$_4$)$_2$ | Ucet Finish 11-74, a vinyl cyclohexene diepoxide (100% solids) manufactured by Union Carbide Corporation. | 12.5 | do | Slightly cloudy. |
| 5 | 1% Zn(BF$_4$)$_2$ | Ucet Finish 11-74 | 3 | do | Slightly cloudy. |

The aqueous dispersions of my invention when incorporated with bodying agents are especially useful when an opaque and non-glossy or "delustered" finish is desired. To demonstrate this feature and to demonstate the compatibility of my aqueous dispersions with a number of bodying agents, aqueous dispersions containing amylopectin (5%) and bodying agents were prepared. Films from the dispersions were then formed on glass and plates and cured at 320° F. for five minutes. The dispersions were clear showing the compatibility of amylopectin and the bodying agents. The cured films were slightly cloudy. Table III shows these results.

the usual finishing operations such as refinish wash to remove any water-soluble materials, etc. Such operations, while often desirable, are not essential.

A further understanding of my process and the new textile treating compositions used therein will be obtained from the specific examples that follow. These examples are not intended, however, to limit the invention.

*Example I*

An aqueous dispersion was prepared by thoroughly agitating a mixture of 43 lbs. of amylopectin and 65 gallons of water at room temperature for 15 minutes. While main-

TABLE III

| Bodying Agent | Weight of Bodying Agent, Percent | Dispersion Clarity | Film Clarity |
|---|---|---|---|
| Rhoplex B-15, an emulsion containing 46% solids of a copolymer formed from 80 parts ethylacrylate, 19 parts methyl methacrylate and 1 part methacrylic acid, all parts by seight, manufactured by Rohm & Haas Company. | 12.5 | Clear | Slightly cloudy. |
| Rhoplex B-15 | 3 | do | Do. |
| Darex 61L, a polyvinyl acetate bodying agent manufactured by Dewey & Almy Chemical Company. | 12.5 | do | Do. |
| Dares 61L | 3 | do | Do. |
| Resyn 25-2833, an acrylic emulsion bodying agent containing 45% solids manufactured by National Starch Products Company. | 12.5 | do | Do. |
| Resyn 25-2833 | 3 | do | Do. |
| Hycar 2671, a modified acrylic polymer bodying agent manufactured by B. F. Goodrich Chemical Company. | 12.5 | do | Clear. |
| Hycar 2671 | 3 | do | Slightly cloudy. |
| Dow Latex 529K, a styrene-butadiene emulsion polymer bodying agent manufactured by the Dow Chemical Company. | 12.5 | do | Clear. |
| Dow Latex 529K | 5 | do | Slightly cloudy. |
| Rhoplex WN-77, an aqueous acrylic polymer dispersion bodying agent manufactured by Rohm & Haas Company. | 12.5 | do | Do. |
| Rhoplex WN-77 | 3 | do | Do. |

The textile finishing compositions of my invention may be applied to cellulose fabrics in various ways so long as impregnation of the cellulose fibers is obtained. For example, the textile materials may be dipped or immersed in the composition or the composition may be dripped, coated or sprayed on the textile material. In order to facilitate the control of deposition of the composition on the textile material and to reduce the drying time, it is desirable to remove excess solution from the textile. This is suitably accomplished by wringing, or squeezing the textile material. The amount of solid material applied to the textile is controlled by the degree of removal and/or the concentration of materials in the composition, it may be varied widely depending on the degree of stiffness and the general balance of properties desired. In general, the amount of ingredients that can be satisfactorily applied to the textile on a dry solids basis ranges between 2 to 100% by weight based on the weight of the dry textile. When it is desired to apply a dry solids add-on approaching 100%, it is necessary to use repeated treatments. However, to obtain practical stiffness it is preferred to apply from about 5 to about 25% by weight based on the weight of the dry textile material.

After the composition has been applied, the textile material may then be dried at normal drying temperatures and finally cured to obtain the water-insoluble condition or the textile may be dried and cured in one heating operation at elevated temperatures. Generally, the temperatures used during curing should not be less than 225° F. and should not exceed temperatures at which cellulose fabrics tend to decompose. Temperatures above 450° F. should be avoided. It is preferable to utilize temperatures ranging from about 250° F. to about 400° F. The duration of heating may vary widely, depending primarily on the temperatures utilized, but is generally between 1 and 15 minutes with the longer times corresponding to the lower temperatures. However, when temperatures above 400° F. are utilized, curing times on the order of a few seconds can and should be employed. The textile materials produced by my process can then be given taining the dispersion at room temperature, the following ingredients were added.

| | |
|---|---|
| 26 lbs. | Aqueous solution containing 50% by weight of dimethylol ethylene urea |
| 8 lbs. 8 oz. | Moropol 700, a nonionic oxidized polyethylene emulsion-type softener manufactured by Mortex Chemical Products, Inc. |
| 13 oz. | Triton X-100, a nonionic octylphenoxy-polyethylene glycol wetting agent manufactured by Rohm & Haas, Inc. |
| 3 lbs. | Zinc nitrate |

Sufficient water was then added to give a finished volume of 100 gallons and the pH of the 100-gallon dispersion was then adjusted to 5.0 with acetic acid. Unmercerized cotton print cloth, which had been desized and bleached, was immersed in the above dispersion at room temperature and padded so as to give a wet pick-up of about 75–80%. The padded cloth was frame dried at room temperature and then cured at 320° F. for 30 minutes. The cloth was then divided into two equal portions and one of the portions was laundered five times. Samples from the unlaundered and laundered portions were then tested for warp stiffness, tear strength, wrinkle recovery and breaking strength using tests described in the Federal Specification Manual CCC-T-191b "Textile Test Methods" published May 15, 1951 by the General Services Administration Business Center of the United States Government, Washington, D.C. The results obtained in the tests utilized are given in Table IV, opposite the fabric designated A. In the warp stiffness test, a smaller numerical value indicates a greater stiffness. In the tear strength, wrinkle recovery and breaking strength tests, the larger numerical values indicate greater performance.

*Example II*

A sample of fabric from the same lot as the fabric utilized in Example I was treated using the procedure and the composition given in Example I with the exception that an oxidized starch (sodium hypochlorite was the oxidizing agent) was utilized instead of amylopectin. The aqueous dispersion of oxidized starch was prepared by thoroughly agitating the mixture of 43 lbs. oxidized starch and 65 gallons water at 200° F. until all of the starch was dispersed. The time required to disperse the starch was 30 minutes. The fabric was divided into two equal portions and one portion was laundered five times. Samples from the unlaundered and laundered portions were tested using the tests designated in Example I. The results obtained are given in Table IV opposite the fabric designated B.

*Example III*

A sample of the fabric from the same lot as the fabric utilized in Example I was treated using the procedure and the composition utilized in Example I with the exception that an hydroxyethylated starch having a degree of substitution of 0.11 was utilized instead of amylopectin (the etherifying agent employed was ethylene oxide). The aqueous dispersion of hydroxyethylated starch was prepared by thoroughly agitating the mixture of 43 lbs. of hydroxyethylated starch and 65 gallons of water at 180° F. until all of the starch was dispersed. The time required to disperse the starch was 20 minutes. The fabric was then divided into two equal portions and one portion was laundered five times. Samples from the unlaundered and laundered portions were tested utilizing the tests designated in Example I. The results obtained are given in Table IV opposite the fabric designated C.

hydrochloric acid solution having a temperature of 200° F. The time required to dissolve the cured film was noted. The results of this test are given in Table V.

TABLE V

| Film tested: | Minutes to dissolve cured film |
|---|---|
| A | 30 |
| B | 15 |
| C | 12 |

The superiority of my textile treating composition in resistance to hydrolysis by hydrochloric acid is especially outstanding in that it is at least twice as resistant to hydrolysis by hydrochloric acid as the compositions containing either oxidized or hydroxyethylated starch.

Since many embodiments of this invention may be made and since many changes may be made in the embodiments described, the foregoing is to be interpreted as illustrative only; and my invention is defined by the claim appended hereafter.

I claim:

A method for finishing textiles to provide a water-insoluble stiffening finish for textiles which is resistant to wrinkling, acid hydrolysis, and losses in tear strength and breaking strength, the method comprising impregnating a textile material comprising cellulose fibers with an aqueous dispersion of about 43 parts of a cold water-soluble material consisting essentially of amylopectin, about 13 parts of dimethylol ethylene urea, about 3 parts zinc nitrate, about 8.5 parts of a nonionic oxidized poly-

TABLE IV

| Fabric Tested | Test 5200 Warp Stiffness in Inches | | Test 5132 Tear Strength in Grams | | Test 5104 Breaking Strength in Pounds | | Test 5212 Wrinkle Recovery in Degrees | |
|---|---|---|---|---|---|---|---|---|
| | Unlaundered | Laundered | Unlaundered | Laundered | Unlaundered | Laundered | Unlaundered | Laundered |
| A | 1-24/32 | 2-14/32 | 1,104 | 1,056 | 98 | 88 | 110 | 137 |
| B | 1-24/32 | 2-16/32 | 1,120 | 1,104 | 99 | 86 | 111 | 133 |
| C | 1-26/32 | 2-21/32 | 1,152 | 1,136 | 98 | 84 | 119 | 139 |

The results related in Table IV show the effectiveness of my new composition in finishing textiles. Textiles treated by the process of Example I using amylopectin were superior to the textiles treated by the processes of Examples II and III using oxidized starch and hydroxyethylated starch respectively in warp stiffness, tear strength, and breaking strength.

*Example IV*

To demonstrate the effectiveness of my new textile treating compositions in resisting hydrolysis by hydrochloric acid, three films were formed on glass plates. The first film, designated A, was formed from the aqueous dispersion described in Example I which contained amylopectin, the second film, designated B, was formed from the aqueous dispersion described in Example II which contained oxidized starch, and the third film designated C, was formed from the aqueous dispersion described in Example III which contained hydroxyethylated starch. Each film was cured at 320° F. for five minutes and the three plates were placed in a beaker containing a 0.025 N ethylene softener, and a nonionic surface active wetting agent, all parts being on a weight basis, adjusting said dispersion to a pH of about 5 and then drying and curing said impregnated textile at a temperature of about 320° F. for about 30 minutes.

References Cited

UNITED STATES PATENTS

| 2,661,312 | 12/1953 | Richardson | 8—116.3 X |
| 2,899,263 | 8/1959 | Nuessle et al. | 8—116.3 |
| 2,917,412 | 12/1959 | Reinhardt et al. | 117—139.4 |
| 3,000,762 | 9/1961 | Tesoro | 8—116 X |
| 3,081,183 | 3/1963 | Roscelli et al. | 106—213 |
| 3,116,967 | 1/1964 | Goldstein et al. | 8—116.3 X |

NORMAN G. TORCHIN, *Primary Examiner.*

J. TRAVIS BROWN, *Examiner.*

H. WOLMAN, *Assistant Examiner.*